May 10, 1938.                    J. SOSS                    2,117,224
                                 SHEARS
                           Filed March 27, 1937
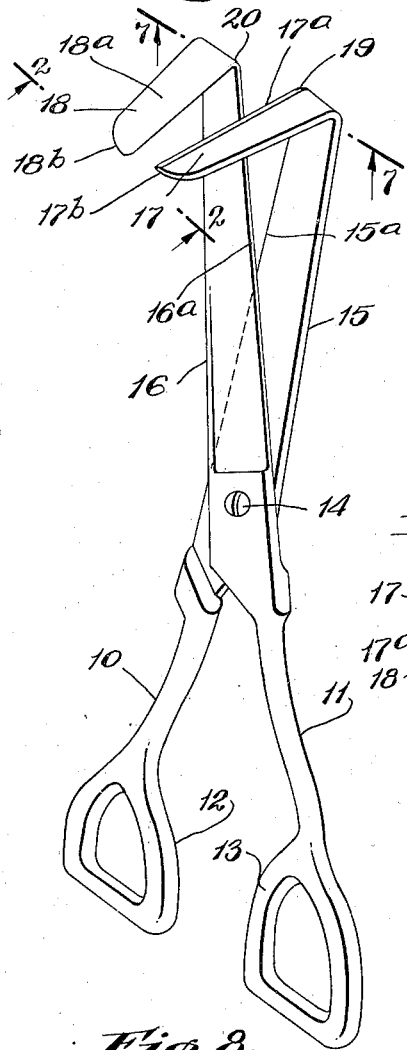
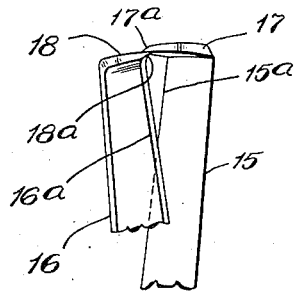
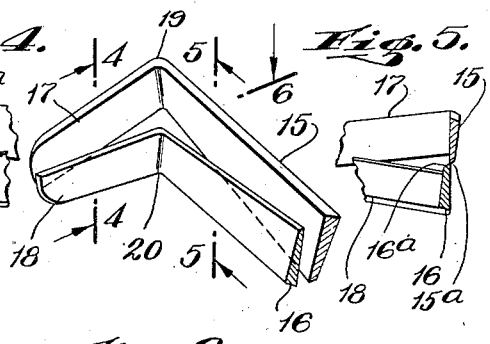
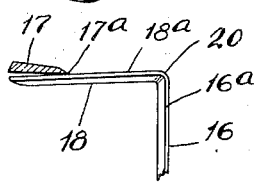
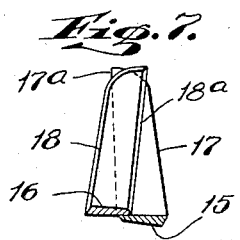
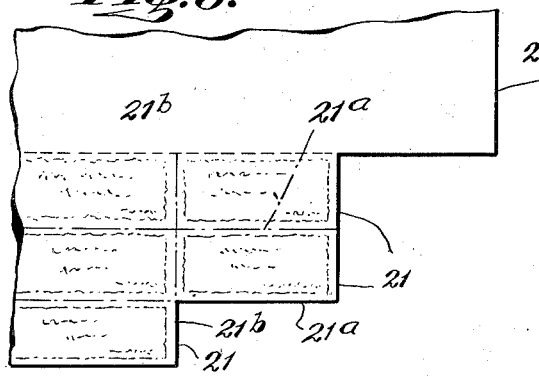
INVENTOR
JOSEPH SOSS
BY
ATTORNEY Patented May 10, 1938

2,117,224

UNITED STATES PATENT OFFICE 2,117,224

SHEARS

Joseph Soss, Roselle, N. J.

Application March 27, 1937, Serial No. 133,293

7 Claims. (Cl. 30—229)

This invention relates to shears and particularly to the provision of a pair of shears having offset blade portions designed to perform an irregular or angular cut and particularly to the adaptation of a pair of shears of this kind for use in clipping the coupons of bonds; and the object of the invention is to provide a device of the character described wherein the cutting blades of the shears comprise offset or angularly disposed blade shearing portions, each portion separately functioning to perform an individual cut, the completion of which terminates at the intersection of the separate offset or angularly disposed cutting portions to form in a predetermined sheet of material a cut of the contour defined by the two shearing portions of the device; a further object being to provide a device or the class described wherein offset or angularly disposed shearing portions have their intermediate or intersecting parts arranged in spaced relationship to each other at the beginning of the cutting operation of the separate shearing portions; a still further object being to provide a pair of shears having a normal pair of shearing blades, the free end portions of which include supplemental shearing blades integral therewith and offset with respect to the cutting edge of the first named blade to provide supplemental shearing elements working in conjunction with the first named blades to form in a predetermined sheet of material a cut of the contour defined by the main and supplemental blades; and with these and other objects in view, the invention consists in a shearing device of the class and for the purpose specified, which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a perspective view of a pair of shears made according to my invention.

Fig. 2 is a view looking in the direction of the arrow 2 of Fig. 1, showing only a part of the construction and showing the shears partially closed.

Fig. 3 is a perspective view of the structure shown in Fig. 2.

Fig. 4 is a section on the line 4—4 of Fig. 3.

Fig. 5 is a section on the line 5—5 of Fig. 3.

Fig. 6 is a plan and sectional view of a part of the construction shown in Fig. 3, the section being substantially on the line 6—6 of Fig. 3.

Fig. 7 is a section on the line 7—7 of Fig. 1, showing the blades in fully closed position; and, Fig. 8 is a diagrammatic plan view of a part of a bond on a reduced scale, illustrating the coupons thereon adapted to be removed by a device such as that disclosed in the other figures.

It is known in the art to provide shears and clipping tools having curved and offset blade ends, but in these known constructions, only one continuous shearing operation is performed by the tool. It is the distinctive feature of my invention to provide a pair of shears having what may be termed a dual simultaneously actuated pair of shearing blades, each pair of blades performing an independent cutting operation in a workpiece, and the cuts of the respective pairs of blades intersecting at the point of intersection between said pairs of blades.

Any type of handle construction may be employed and to illustrate one use of my invention, I have shown in Fig. 1 of the drawing a pair of shears employing two handle members 10 and 11 having any kind or class of finger loops 12, 13 for actuating the same, the handle members being pivotally connected as at 14. Extending outwardly from the pivot are two blades 15 and 16, the blades 15 and 16 being more or less of conventional form and being provided with shearing or cutting edges 15a, 16a which tensionally engage each other to perform a cutting operation in a suitable workpiece as with shears of well known construction.

In practice, I provide on the outer ends of the blades 15 and 16, a pair of supplemental blades 17 and 18 which in the construction shown are formed integral with or as extensions of the blades 15 and 16. The supplemental blades are provided with shearing or cutting edges 17a, 18a, and the free end portions 17b, 18b of the supplemental blades are suitably finished or rounded and are toed inwardly, or, in other words, are offset inwardly with respect to the cutting edges 15a, 16a so as to dispose the intersecting corner portions 19 and 20 of the respective pairs of blades 15 and 16, 17 and 18, in spaced relation to each other when the cutting edges of both pairs of blades are in operative engagement, as is clearly illustrated in Fig. 3 of the drawing. The corner portions 19 and 20 are brought together and overlap each other on the completion of the cutting stroke, as shown in Fig. 7.

The supplemental blades 17 and 18 are so disposed with respect to each other as to provide tensional engagement of the shearing edges 17a, 18a thereof throughout the entire movement of said supplemental blades one with respect to the other in a shearing operation, in the same manner as it is customary to tensionally engage the cutting edges 15a, 16a of the blades 15 and 16. However, the flexure of each pair of blades is independent so as to insure proper cutting operation of both pairs of blades in order that a complete angular or L-shaped cut may be formed in a workpiece, for example, in trimming coupons 21 from a bond 22, as diagrammatically represented in Fig. 8 of the drawing. In this connection, it will be understood that the pair of blades 15 and 16 may begin the cutting operation of the workpiece, for example, one of the coupons along the long edge 21a thereof. After part of this long edge has been cut, the supplemental blades 17 and 18 will engage and cut the shorter edge 21b of the bond coupon. In other instances, however, the cutting operation of the workpiece may be started simultaneously or substantially so with each pair of blades employed, and the relative length of the main and supplemental blades may be varied to suit the different uses for which the tool is intended.

At this time, it is also to be borne in mind that the shape or contour of the main as well as the supplemental blades may be varied to suit the different uses to which shears of this type may be applied. In fact, a set of shears involving several arrangements of the main and supplemental blades may be sold to perform a number of different types of cutting or shearing operations in a suitable workpiece, and the tool may be made of such strength as to adapt it for use in cutting sheet material of various kinds and classes including sheet metal. While the blades 15 and 16 are shown as longer than the blades 17 and 18, these blades may be of the same length and, in some cases, the latter blades may be longer than the first mentioned blades, again depending upon the use to which the invention is applied.

My improved device may be used in cutting strips or ribbons of various materials cut in irregular contour, in which event, the two shearing portions may be disposed at opposite side edges of the strips or ribbons which may be fed between said shearing portions. In other cases, the device may be used to cut the V-ed or trimmed ends of ribbons or the ends of bows made in ribbons as well as the trimmed ends of badge ribbons and the like.

Having fully described my invention what I claim as new and desire to secure by Letters Patent, is:

1. A cutting tool of the class described comprising pivotally connected handle members, a pair of blades extending from and actuated by said handle members, said blades having interengaging cutting edges extending longitudinally thereof, a pair of supplemental blades integral with the free end portions of the first named blade and offset with respect to and supported solely by the first named blades, said supplemental blades having interengaging cutting edges adapted to perform an independent shearing operation in the movement of the first named blades toward each other in performing a shearing operation, and the intersection between the first named and supplemental blades being disposed in spaced relation to each other when both pairs of blades are in operative engagement with each other.

2. A cutting tool of the class described comprising pivotally connected handle members, a pair of blades extending from and actuated by said handle members, said blades having interengaging cutting edges extending longitudinally thereof, a pair of supplemental blades integral with the free end portions of the first named blade and offset with respect to and supported solely by the first named blades, said supplemental blades having interengaging cutting edges adapted to perform an independent shearing operation in the movement of the first named blades toward each other in performing a shearing operation, the intersection between the first named and supplemental blades being disposed in spaced relation to each other when both pairs of blades are in operative engagement with each other, and the intersections of said pairs of blades overlapping on the completion of the shearing stroke of said blades.

3. A cutting tool of the class described comprising pivotally connected handle members, a pair of blades extending from and actuated by said handle members, said blades having interengaging cutting edges extending longitudinally thereof, a pair of supplemental blades integral with the free end portions of the first named blade and offset with respect to and supported solely by the first named blades, said supplemental blades having interengaging cutting edges adapted to perform an independent shearing operation in the movement of the first named blades toward each other in performing a shearing operation, the intersection between the first named and supplemental blades being disposed in spaced relation to each other when both pairs of blades are in operative engagement with each other, the intersections of said pairs of blades overlapping on the completion of the shearing stroke of said blades, the cutting edges of the first named blades being in constant engagement with each other in the several positions of the device, and the cutting edges of the supplemental blades being movable into spaced relation to each other when the first named blades are in predetermined open positions.

4. The combination with a pair of shears having cutter blades, of a pair of supplemental blades integral with and supported only by the free end portions of the first named blades, said supplemental blades being offset in the direction of one side surface of the first named blades and the free end portions of the supplemental blades being toed inwardly to bring the cutting edges of the supplemental blades at the free ends thereof in engagement prior to the ends of said supplemental blades joining the first mentioned blade to perform a cutting operation independent of the cutting operation of the first named blades in a predetermined workpiece.

5. The combination with a pair of shears having cutter blades, of a pair of supplemental blades integral with and supported only by the free end portions of the first named blades, said supplemental blades being offset in the direction of one side surface of the first named blades and the free end portions of the supplemental blades being toed inwardly to bring the cutting edges of the supplemental blades at the free ends thereof in engagement prior to the ends of said supplemental blades joining the first mentioned blade to perform a cutting operation independent of the cutting operation of the first named blades in a predetermined workpiece, and the intersection between the main and supplemental blades being spaced apart at the beginning of the cutting stroke of both pairs of blades and overlapping at the completion of a cutting stroke.

6. A pair of shears for clipping the coupons of bonds, said shears having a pair of long blade members, the free ends of said blade members being offset substantially at right angles to the longitudinal plane of said blade members and toed inwardly to form a supplemental pair of blades supported only by the first named blade members, said supplemental blades being adapted to perform a shearing operation independent of the shearing operation of the first mentioned blade members to form a right angle or L-shaped cut facilitating the removal of an entire bond coupon in a single shearing stroke of said shears.

7. A pair of shears of the class described comprising blade members movable toward and from each other to bring longitudinal cutting edges into engagement with each other to form a cutting operation in a suitable workpiece, the outer end portion of said blades being supported and operated only by said blade members and offset in the direction of the cutting edges to provide an independent shearing or cutting operation from the outer end of the blades inwardly in the normal shearing operation of said blades from the inner ends thereof outwardly.

JOSEPH SOSS.